United States Patent
Fee

(10) Patent No.: US 12,363,261 B2
(45) Date of Patent: *Jul. 15, 2025

(54) IN-BAND VIDEO COMMUNICATION

(71) Applicant: CONTROLLED ELECTRONIC MANAGEMENT SYSTEMS LIMITED, Belfast (GB)

(72) Inventor: Paul Fee, Belfast (GB)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/313,980

(22) Filed: May 8, 2023

(65) Prior Publication Data

US 2023/0283750 A1    Sep. 7, 2023

Related U.S. Application Data

(63) Continuation-in-part of application No. 17/370,975, filed on Jul. 8, 2021, now Pat. No. 11,671,567.

(51) Int. Cl.
| | |
|---|---|
| *H04N 7/18* | (2006.01) |
| *G06V 20/52* | (2022.01) |
| *H04N 7/01* | (2006.01) |
| *H04N 23/69* | (2023.01) |
| *H04N 23/695* | (2023.01) |

(52) U.S. Cl.
CPC ............... *H04N 7/18* (2013.01); *G06V 20/52* (2022.01); *H04N 7/0117* (2013.01); *H04N 23/69* (2023.01); *H04N 23/695* (2023.01)

(58) Field of Classification Search
CPC ........ H04N 7/18; H04N 7/0117; H04N 23/69; H04N 23/695; G06V 20/52
See application file for complete search history.

(56) References Cited

U.S. PATENT DOCUMENTS

| | | | |
|---|---|---|---|
| 10,136,166 B1* | 11/2018 | Wang | H04N 21/2365 |
| 10,212,306 B1* | 2/2019 | Goyal | H04N 1/00251 |
| 2008/0288986 A1* | 11/2008 | Foster | H04N 21/4367 |
| | | | 348/E7.086 |
| 2020/0285226 A1* | 9/2020 | Chatterjee | G05B 23/0227 |
| 2020/0334470 A1* | 10/2020 | Abeykoon | H04N 7/18 |
| 2021/0168346 A1* | 6/2021 | Mooney | H04N 21/44008 |

* cited by examiner

*Primary Examiner* — Randy A Flynn
(74) *Attorney, Agent, or Firm* — ArentFox Schiff LLP

(57) ABSTRACT

A method for video management within a CCTV system includes receiving, at a computing device via one or more intermediate devices in the CCTV system, a video stream generated by a sensor device of the CCTV system. The video stream includes a plurality of video frames. The computing device sends, via the one or more intermediate devices of the CCTV system, an instruction to a sensor device configured to generate a video stream including a plurality of video frames. The computing device receives, via the one or more intermediate devices of the CCTV system, one or more frames of the plurality of video frames embedded with metadata associated with performance of the instruction by the sensor device. Performance of the CCTV system is evaluated using the metadata embedded within the one or more video frames.

18 Claims, 8 Drawing Sheets

IN-BAND VIDEO COMMUNICATION

CROSS REFERENCE TO RELATED APPLICATION(S)

This application is a continuation in part of U.S. Non-Provisional application Ser. No. 17/370,975, entitled "IN-BAND VIDEO COMMUNICATION" and filed on Jul. 8, 2021, which is expressly incorporated by reference herein in the entirety.

BACKGROUND

The present disclosure relates generally to a video surveillance management system, and more specifically, to in-band video communication.

Generally, a CCTV (closed circuit television) system is comprised of numerous devices. Occasions arise when it is desirable for these devices to communicate with each other. However, intermediate pieces of equipment within the CCTV system may not be setup to facilitate such communication. For instance, video may pass through a collection of devices, which are known to transport the video but may not be able to transport additional communications channels.

Accordingly, improvements in video surveillance management systems are needed.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Aspects of the present disclosure provide a method for using in-band data as a general-purpose communications channel.

In an implementation, for example, the present disclosure includes a method for video management within a CCTV system. The method includes receiving, at a computer device via one or more intermediate devices in the CCTV system, a video stream generated by a sensor device of the CCTV system. The video stream includes a plurality of video frames. The computer device sends, via the one or more intermediate devices of the CCTV system, an instruction to a sensor device configured to generate a video stream including a plurality of video frames. The computer device receives, via the one or more intermediate devices of the CCTV system, one or more frames of the plurality of video frames embedded with metadata associated with performance of the instruction by the sensor device. Performance of the CCTV system is evaluated using the metadata embedded within the one or more video frames.

In another aspect, a method for embedding metadata into a video stream within a Closed Circuit Television (CCTV) system that includes generating, by a sensor device of the CCTV system, a video stream including a plurality of video frames, and transmitting, by the sensor device via one or more intermediate devices in the CCTV system, the generated video stream to a receiving computing device. The method further includes receiving, by the sensor device via the one or more intermediate devices in the CCTV system, an instruction from the receiving computing device, and performing, by the sensor device of the CCTV system, the instruction received from the receiving computing device. Also, the method includes embedding, by the sensor device of the CCTV system, metadata associated with performance of the instruction by the sensor device into one or more frames of the plurality video frames. Additionally, the method includes transmitting, by the sensor device via one or more intermediate devices in the CCTV system, metadata associated with performance of the instruction by the sensor device into one or more frames of the plurality video frames.

Additional aspects may include an apparatus including a memory and a processor coupled with the memory and configured to perform either of the above-noted methods. Further aspects may include a computer-readable medium storing instructions executable by a processor to perform either of the above-noted methods.

In another aspect, a CCTV system for video management includes a hardware processor configured to receive, via one or more intermediate devices in the CCTV system, a video stream generated by a sensor device of the CCTV system. The video stream includes a plurality of video frames. The hardware processor is also configured to: send, via the one or more intermediate devices of the CCTV system, an instruction to a sensor device configured to generate a video stream including a plurality of video frames and receive, via the one or more intermediate devices of the CCTV system, one or more frames of the plurality video frames embedded with metadata associated with performance of the instruction by the sensor device. The hardware processor is further configured to evaluate performance of the CCTV system using the metadata embedded within the one or more video frames.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components may be shown in block diagram form in order to avoid obscuring such concepts.

Aspects set forth below place in-band metadata within audio/video streams to help annotate each video frame and to facilitate diagnostics. The inserted metadata may be used to validate video transmission through a series of devices despite intermediate equipment being unaware of the additional metadata within the transmitted stream. The metadata may also aid performance measurements, such as round-trip latency within a CCTV system.

Figure 1:
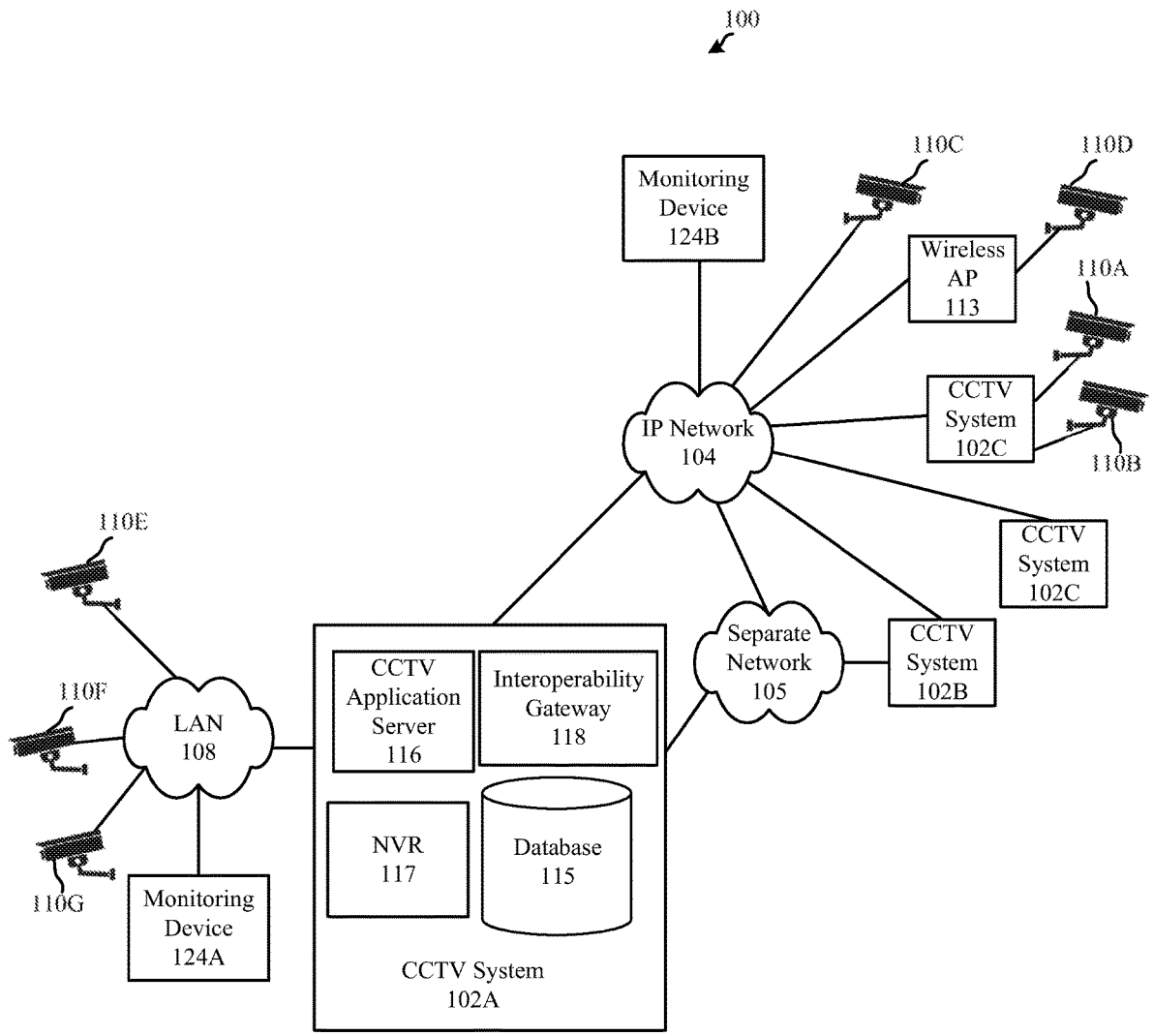
FIG. 1 is a block diagram of a system for video management within CCTV systems.
Figure 6:
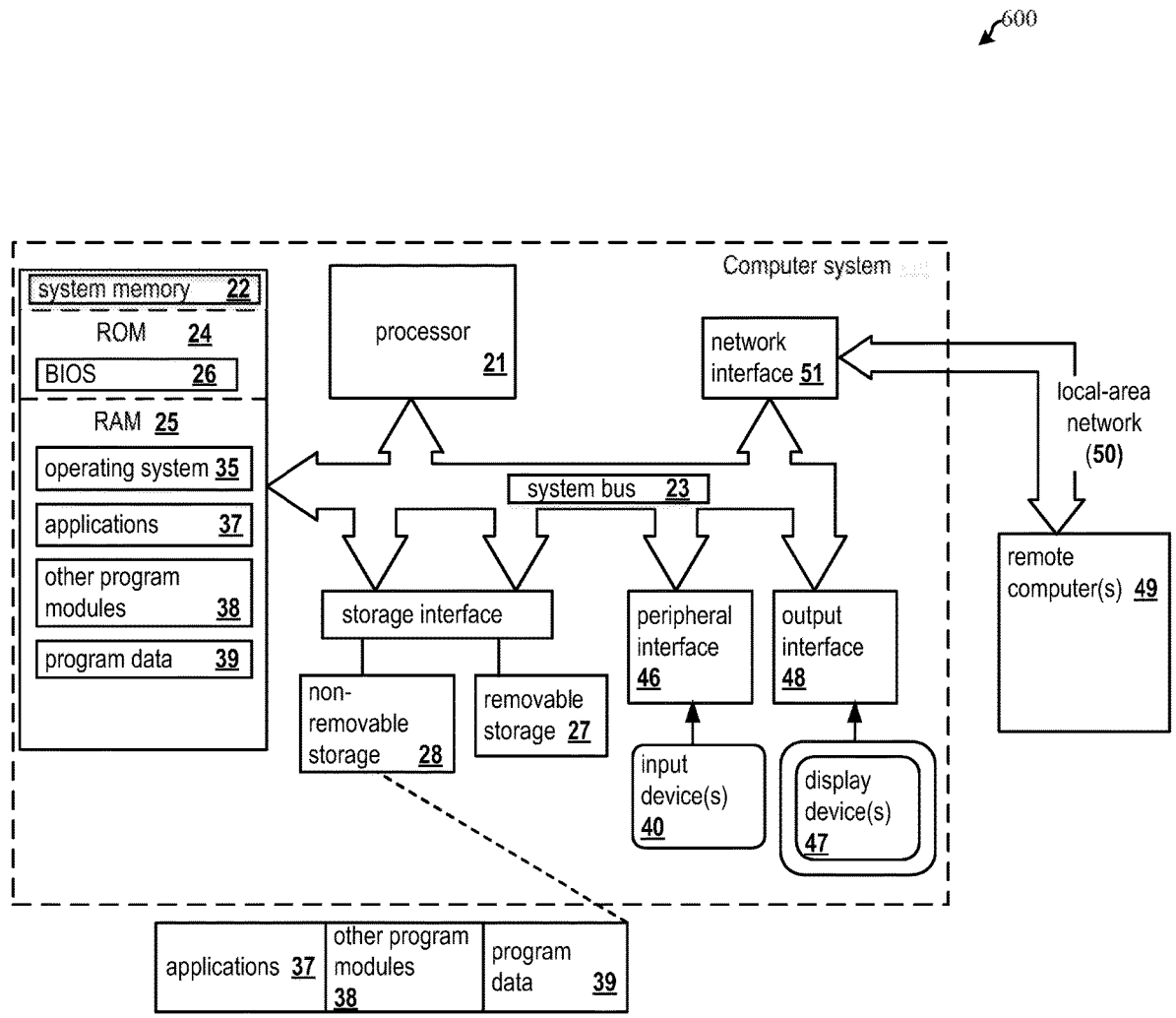
FIG. 6 illustrates an example of a general-purpose computer system.

FIG. 1 is a block diagram illustrating an example system 100 for video management within CCTV systems. As shown, system 100 illustrates CCTV systems 102 (including systems 102A through 102C), CCTV application server 116, sensors (e.g., video cameras) 110 (including sensors 110A through 110G), monitoring devices 124 (including devices 124A and 124B), and networks including, for example, Local Area Network (LAN) 108, and Internet Protocol (IP) Network 104. One or more of the devices or systems shown may be implemented on one or more computing devices using hardware, software, or a combination thereof. Such a computing device is shown in FIG. 6 and may include, but is not limited to, a device having a processor and memory, including a non-transitory memory, for executing and storing instructions. The memory may tangibly embody the data and program instructions. Software may include one or more applications and an operating system. Hardware may include, but is not limited to, a processor, memory, and graphical user interface display. The computing device may also have multiple processors and multiple shared or separate memory components. For example, the computing device may be a part of or the entirety of a clustered computing environment.

CCTV system 102A-C may each include a variety of network interfaces (not shown) including wireless and wired network interfaces to support a variety of network protocols. Each CCTV system 102, may implement and host one or more CCTV applications for management of one or more video cameras 110 across one or more networks. In an aspect, CCTV system 102A, for example, may manage or monitor video cameras 110E-G through LAN 108 and video cameras 110A-D through Internet Protocol (IP) network 104.

Video cameras 110 may be mounted surveillance video cameras that are analog cameras or IP cameras, which may be powered over Ethernet cables (PoE). Such surveillance cameras may have pan, tilt, and zoom (PTZ) capabilities. In an aspect, video camera 110 may capture a video feed and may insert metadata associated with an operating status of the video camera to be transmitted, via a network, to one or more of CCTV systems 102 managing video camera 110. The metadata may include at least one of the following information related to video camera 110: unique video camera identifier (ID), group video camera ID, one or more associated user IDs, geolocation information, timestamp of captured video, direction, inclination, angle, moment, velocity, acceleration, or other environmental parameters.

For example, video cameras 110A-D may be representative of surveillance cameras mounted on the exterior of and/or within office buildings, near bus stops, at traffic intersections, etc. Video cameras 110A-B may be managed through CCTV server 116 having connection to IP network 104.

In an aspect, video cameras, such as video cameras 110D, may be coupled to wireless access point (AP) 113 that transmits video streams to CCTV system 102A through IP network 104. In a further aspect, video cameras, such as video camera 110C, may include networking hardware to connect to IP network 104 directly. In an aspect, one or more video cameras 110, such as video camera 110C, may be wearable video cameras.

In an aspect, to integrate various communications functionality, e.g., in-band data as a general-purpose communications channel functionality, within a CCTV system, CCTV system 102A may include CCTV application server 116, database 115, network video recorder (NVR) 117, and interoperability gateway 118.

CCTV application server 116 may provide the functionality of the CCTV application through one or more graphic user interfaces (GUI) such as those that will be further described. In an aspect, the CCTV application may be a server-based software application communicatively coupled to software clients installed and operating on computing devices, such as monitoring device 124. In an aspect, the installed software clients may instead be application instances of the CCTV application.

In an aspect, interoperability gateway 118 may include logic to enable multimedia communications including, but not limited to, video file or video camera feed data to be transmitted to or shared with a separate or distinct CCTV system, such as CCTV systems 102B or 102C. Each of CCTV systems 102B and 102C may operate a different communication or network interface. In an aspect, interoperability gateway 118 may transmit the multimedia communications to interoperability gateways or console applications residing on separate network 105 or within, for example, CCTV system 102B. Each of separate network 105 and CCTV system 102B may be under the control or administration of an agency or operator different from that administering CCTV system 102A.

Additionally, interoperability gateway 118 may validate a video stream's sharing permissions based on metadata associated with or embedded within the video feed. Upon validation, interoperability gateway 118 may retransmit or authorize transmission of the video stream to CCTV systems 102 or across other networks.

Database 115 may be any type of structured data store, including a relational database that stores information associated with entities using the CCTV application provided by CCTV system 102A or associated with entities being controlled through CCTV system 102A. For example, information associated with using entities may include information or parameters of operators and associated computing devices 124. Information associated with controlled entities may include metadata to be inserted into a corresponding video stream by video cameras 110.

NVR 117 may be one or more video storage devices having application software for storing, searching, and retrieving stored video files. In an aspect, NVR 117 may store video files in association with metadata tags, keywords, and other associated information files that are relationally associated with the video file and/or which are embedded as metadata within the video format and stored file.

Therefore, NVR 117 may enable an operator accessing the CCTV application to not only view a live video feed but also retrieve stored video feeds of video cameras 110 based on one or more search criteria. In an aspect, an operator may input a search criterion within the CCTV application managed by CCTV application server 116. NVR 117 may receive the search criterion and query the stored video files based on the search criterion to locate one or more video files associated with the search criterion. In an aspect, NVR 117 may be representative of a system of devices, each of which may be implemented on one or more processors.

Monitoring device 124 may be one or more stationary devices at a control monitoring center or station that are used by one or more operators to monitor one or more video cameras 110. An operator may interface with a client or CCTV application instance on the monitoring device 124 to access the video streams provided by video cameras 110.

Figure 2:
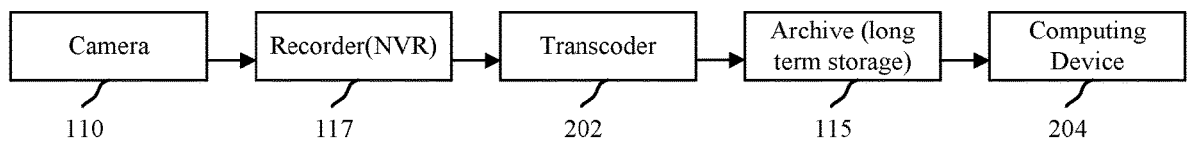
FIG. 2 is a block diagram illustrating an example of video traversing through a number of intermediate devices before being displayed to a user of the CCTV system.

FIG. 2 is a block diagram of illustrating an example of video traversing through a number of intermediate devices before being displayed to a user of the CCTV system.

In FIG. 2, a particular video stream traverses a number of devices, e.g., devices 110, 117, 202, 115, and 204, before being displayed.

In an aspect, a camera 110 is the source of the video stream, which is received by a recorder 117 (such as NVR) for initial, short term storage. NVRs 117 are typically built around and deployed with memories of limited sizes, in order to contain cost. While mass storage and mass storage management may be included in such devices, for example, a computer-type hard drive. A 'lightweight' memory solution is envisioned in an aspect, in which an abbreviated memory or memory buffer is used to temporarily store video streams collected during a predetermined time of service, for example a day. Periodically or upon user's request, NVR 117 may transfer the collected video streams to a different memory for management and analysis, such as an archive 115.

In an aspect, a transcoder 202 may alter the video stream by decoding (for example, from an H.264 format), altering (e.g., reducing the resolution) and encoding once more (for example, back to the H.264 format). The ability to perform transcoding on the fly may simplify storage and management involved with supporting adaptive streaming. It will be appreciated that by generating requested video stream portions on the fly, the amount of storage required to implement adaptive streaming may be reduced significantly.

In an aspect, monitoring devices 124 (shown in FIG. 1) often may need to retrieve previously stored video data from a data archive library systems 115 that may be connected to the CCTV application server 116 and/or NVR 117 for data archiving. The data archiving solutions 115 may employ one or more tape library systems. To mitigate the unnecessary transfer of unwanted data during the search for specific data, the desired data may be identified based on information other than the data itself, before the entire set of video streams are retrieved from the tape library to the user. Such a technique for screening of data improves the overall performance and usability of the archive system 115. In an aspect, video streams fetched from the archive system 115 may be viewed by users using a computing device having a video display 204.

During CCTV product development process, it may be useful for devices 110-117 and 202-204 to communicate with each other. It should be noted that at least some of the devices 110-117 and 202-204 may be from different vendors and could be incompatible with each other. The inter-device communication is important because each of the aforementioned devices 110-117 and 202-204 serve a particular function. The computing device 204 may, for example, need to verify that: 1) every video frame is present in the received video stream; 2) every video frame is received in the correct order; 3) every video frame is received from the correct camera; and 4) every video frame is received with the correct timing data.

In aspects that include the disclosed CCTV system, each video frame may be annotated with metadata. This scheme enables devices receiving the video stream 115-117 and 202-204 to extract the metadata and confirm that the video stream had traversed the intermedia devices correctly. Aspects of the inventive concept disclosed herein provide mechanisms for distributing the metadata between the devices 110-117 and 202-204. Placing the metadata in-band allows it to pass through devices not necessarily designed to carry additional data. Advantageously, the computing device 204 may extract the metadata included within the video stream received from the camera 110 to evaluate the performance of the CCTV system, such as performance measurements and fault detection.

In aspects, the computing device 204 thus can employ the metadata, describing an operating status of one or more devices 110-117 and 202 to assess network quality and latency, for example. In aspects, when the video camera 110 comprises a motorized camera having PTZ capabilities, the computing device 204 may be interested in determining PTZ responsiveness time of the video camera 110. Pan/tilt base of the PTZ video camera 110 may have a pan range of 360° continuous. In other words, pan/tilt base of the camera 110 can move in any direction. The pan/tilt base also may have a tilt range of +90° to −90° from level. The pan/tilt base may incorporate other dimensions and capabilities as needed. The pan/tilt base may incorporate a step motor in moving the camera 110 to desired positions. Thus, when an operator instructs the camera 110 to pan left, the computing device 204 may need to know how long it takes for this instruction to be reflected within the camera video stream.

In an aspect, the CCTV application server 116 may be configured to provide a GUI to perform contiguous video camera alignment. This functionality may be provided via additional user interface elements included in the above-mentioned GUI for specifying lane/path boundaries. Contiguous video camera alignment refers to the fact that during an initial camera hardware installation process, or if existing camera hardware is later updated, if the camera 110 is equipped with PTZ function, the pan, tilt, and/or zoom settings of the camera 110 need to be adjusted and/or calibrated to ensure there is sufficient overlap in the field of vision between cameras. The CCTV application server 116 can review the received metadata to determine whether a handoff zone of sufficient size and/or duration is provided by a pair of cameras. If not, pan, tilt, and/or zoom settings may require changes, or the physical installation location of a camera may need to be changed altogether. In an aspect, the metadata within the analyzed video stream could contain acknowledgements of PTZ instructions, allowing the computing device 204 receiving the video stream to measure PTZ round trip latency, for example.

Figure 3:
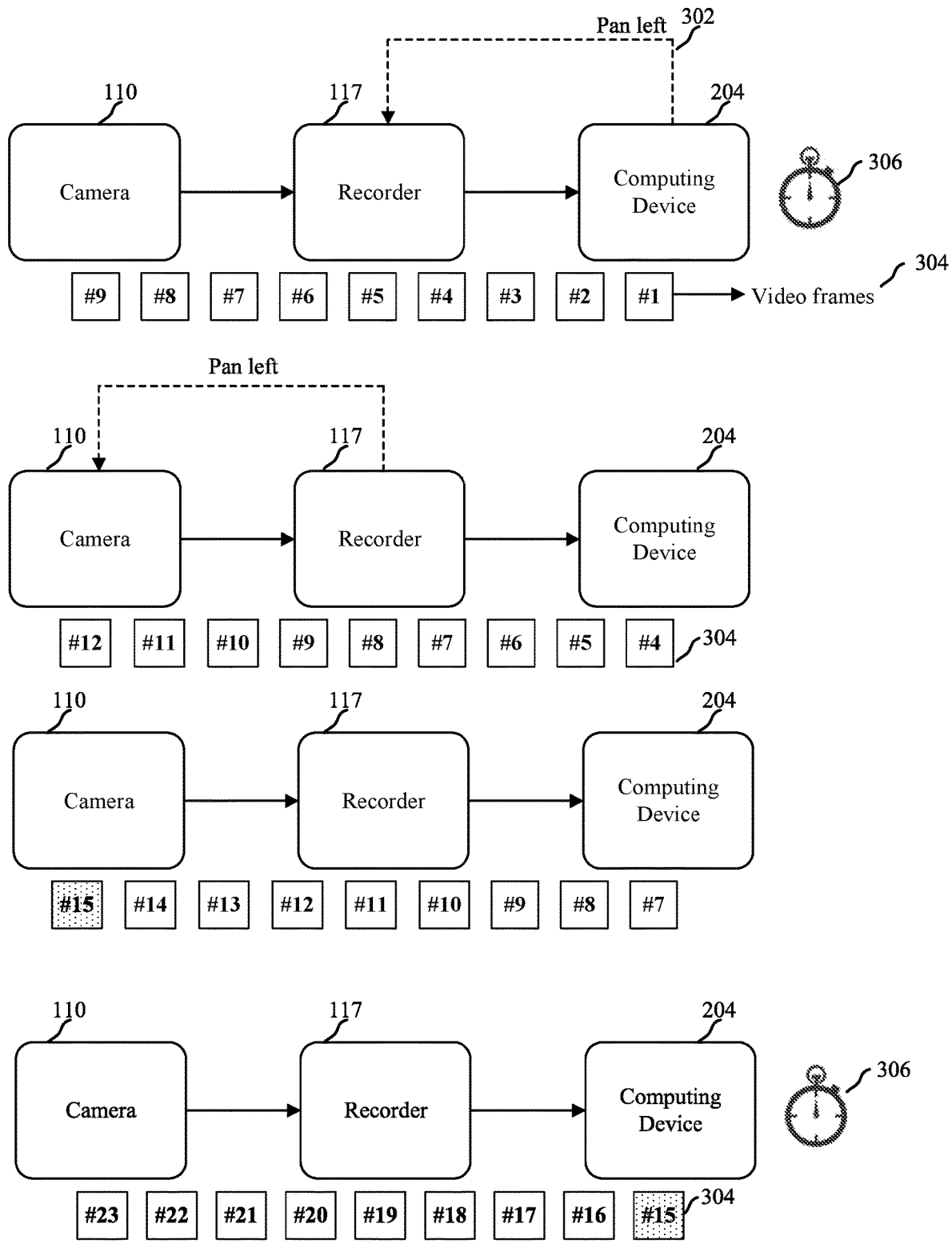
FIG. 3 is a block diagram illustrating propagation of video frames while processing and acknowledging received instruction within the CCTV system.

FIG. 3 is a block diagram illustrating four different snap shots in time representing propagation of video frames while processing and acknowledging received instruction within the CCTV system. As shown in FIG. 3, a technician (operator) may use a control console (not shown in FIG. 3) communicatively coupled to the computing device 204 to send an instruction 302 to the camera 110. In this example, the PTZ instruction 302 may request the pan/tilt base of the camera 110 to pan the camera 110 left. In response to sending the instruction 302, the computing device 204 may start the clock 306 to measure PTZ round trip latency.

While the PTZ instruction is sent by the computing device 204, a video stream comprising a plurality of video frames 302 is transmitted from the video camera 110 to the computing device 204 via the recorder device 117. In this example, the plurality of video frames 302 include frame #1 through frame #23. In an aspect, the cross-hatching or lack thereof in the box representing each frame represents frames captured before the instruction 302 is received by the camera 110 (e.g., frame #1 through frame #14), a frame in which the instruction 302 is received and processed (e.g., frame #15), and frames captured after the instruction 302 is executed by the camera 110 (e.g., frame #16 through frame #23). The recorder device 117 in this example comprises an intermediate device.

The PTZ instruction 302 progresses through intermediate devices (the recorder 117) and eventually reaches the video camera 110. It should be noted that video frames 304 already in flight (e.g., frame #1 through frame #14) arrive to the computing device 204 unaffected by the PTZ instruction 302. When the PTZ instruction 302 arrives at the video camera 110 (e.g., at frame #15), the pan/tilt base of the camera 110 adjusts its position according to the received PTZ instruction 302. Subsequent portions of the video stream (e.g., frame #16 through frame #23) reflect adjusted field of view. In an aspect, in response to receiving the PTZ instruction 302, the video camera 110 may insert metadata into the frame numbered 15 that acknowledges the received PTZ instruction 302. As video camera 110 continues to transmit the video stream towards the computing device 204, eventually, the frame number 15 reaches the computing device 204. In response, the computing device 204 may stop the clock 306 and may measure the PTZ round trip latency.

Further, the in-band measurement of CCTV network performance may be useful during development of CCTV systems. To achieve maximum efficiency, intermediate devices (in this example the video recorder 117) should relay both instructions and video data (video stream) with minimal latency. Effectively, any device along the video pathway of a particular video stream that can intercept the in-band messages can read, modify and relay the in-band message. Incompatible devices would generally transmit the received in-band message untouched. During product development, system performance measurements, such as latency measurements for example, can help highlight performance bottlenecks, enabling subsequent product improvements.

Similarly, latency measurements can also be useful during deployment of CCTV equipment. When the physical distance between the end devices becomes large, factors such as network topology, equipment selection and protocol choice may influence the overall performance of the system. Based on system performance measurements on real world deployments, system performance may be improved by diagnosing existing issues and by facilitating system tuning.

As described above, the system performance may be evaluated based on the metadata included within the video frames of a video stream. However, audio channels may also carry data. In an aspect, human discernible or detectable tones can be used by the CCTV system to convey metadata. A challenge exists in delivering distributed multimedia to devices within the CCTV system so that video imagery and/or audio is/are synchronized. Audio, video, and/or the like, may become disinteresting if the time synchronization is not managed effectively. The aforementioned metadata embedded within audio channels could be used to facilitate measurement of audio/video synchronization. Some systems transmit and store audio and video channels separately, leading to time drift between the two channels. In other words, with inter-stream synchronization, the play-out of one media stream, e.g., a video stream, may constitute a reference for the play-out of another media stream, e.g., an audio stream, or vice versa, e.g., to achieve lip synchronization. Metadata in both audio and video channels can be used to measure this lip synchronization.

Figure 4:
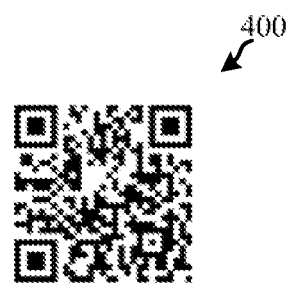
FIG. 4 is an example of metadata transmitted within a video stream.

FIG. 4 is an example of metadata transmitted within a video stream. In the illustrated example, to facilitate the transmission of metadata within a video stream, modifications are placed within the frames that constitute a video. In an aspect, each frame of a video stream may contain embedded content that conveys the data to be transmitted. Such embedded content should be able to survive intermediate transmission and modification by intermediate devices. Furthermore, such embedded content should be recognizable and decodable by compatible receiver devices. In an aspect, inserting metadata into the one or more video frames of the annotated video stream may include inserting a 2-dimensional bar code representing the metadata into the one or more video frames. One such inserting technique could be to place a QR code 400 within each image. For example, QR codes 400 can be of a same size, or of a threshold number of sizes with each size being visually identifiable (e.g., each size may be a particular color). Furthermore, the QR code 400 may occupy the entire video frame or a portion of the video frame.

The size of the QR code 400 may be influenced by a number of factors. One factor that may influence the size of the QR code 400 may be how much information (for example, how many bits) may each QR code 400 store. Resolution of the video frames into which the QR code 400 may be placed is another factor. This allows for the transmission and reception of metadata within large, high resolution still images and video as well as their display on a screen with 1136×640 resolution that delivers 326 pixels-per-inch (ppi), for example. Yet another factor that may influence the size of the QR code 400 may be whether the resolution of the video frame containing the embedded metadata may be reduced by intermediate devices. The use of a larger QR code 400 may tolerate better the reduction of the resolution by the intermediate devices.

A further aspect is that a device inserting the QR code 400 (for example, video camera 110) can choose to have different QR codes 400 be placed in each video frame or each QR code 400 may linger for a few frames. If each frame stores a number of metadata bits and video has a frame rate, the bitrate of the disclosed metadata communication channel may be determined by multiplying the bitrate and the frame rate.

Few different encoding schemes are possible. In a first scheme, each QR code 400 may store metadata associated with an individual frame. In a second scheme, a single, static QR code 400 may persist across a few different video frames. This scheme allows spatial scalability with multiple qualities (e.g., resolution, bitrate, frame rate, or other quality). The video stream of the low quality video, which can have, for example, low resolution, bitrate, frame rate, or other quality may be sent between the intermediate devices. It should be noted that the computing device 204 may encode this low quality stream back for playing, such that the highest quality video is available for rendering. Furthermore, this scheme enables reception of metadata across "air gaps", where the video stream could be displayed on screen and then captured and decoded by another video camera. Video recording involves capturing multiple images using a fixed frame rate. However, in this case the video camera's 110 recording frame rate need not necessarily match the frame rate of the computing device 204. In an aspect, in a third scheme, a sequence of different QR codes 400 representing a stream of metadata may be inserted into two or more video frames of the annotated video stream. This technique may be useful when the size of the metadata to be encoded is greater than what can be encoded into a single frame.

It should be noted that metadata encoding schemes are not limited to 2-dimensional bar codes 400 illustrated in FIG. 4. In an optional aspect, the metadata may be encoded by inserting a series of pixels along the edge of the image. The conventional vertical blanking interval (VBI) of a transmitted video signal may preferably be used to carry the metadata. It is appreciated that transport of VBI data is also typically provided in digital television systems to support features of an incumbent analogue video, and since the VBI data is frame related, the VBI data may be used to carry a frame reference from the video camera 110 to the computing device 204. It is appreciated that any VBI line may be used, but typically, VBI lines that are used for Vertical Interval Timecode or for Teletext lines may be employed. Teletext supports private data carriage, and is therefore capable of transporting a data value representing metadata for each video frame. In yet another scheme, the metadata could be encoded with the aid of steganographic methods. It should be noted, however, that these steganographic methods have to survive an encoding and decoding process. The scheme utilizing steganographic methods enables the described communication channel to be used alongside intended CCTV use, rather than being limited to system testing scenarios.

As noted above, for the in-band placement of metadata within audio channels, tones such as the dual tone multi-frequency (DTMF) signals used for telephones may provide one audio encoding approach. The use of audio channels for metadata transmission may be used to facilitate measurement of audio/video synchronization. The in-band placement of metadata within audio channels may also be used as a low-bandwidth general purpose one-way communication channel.

Figure 5:
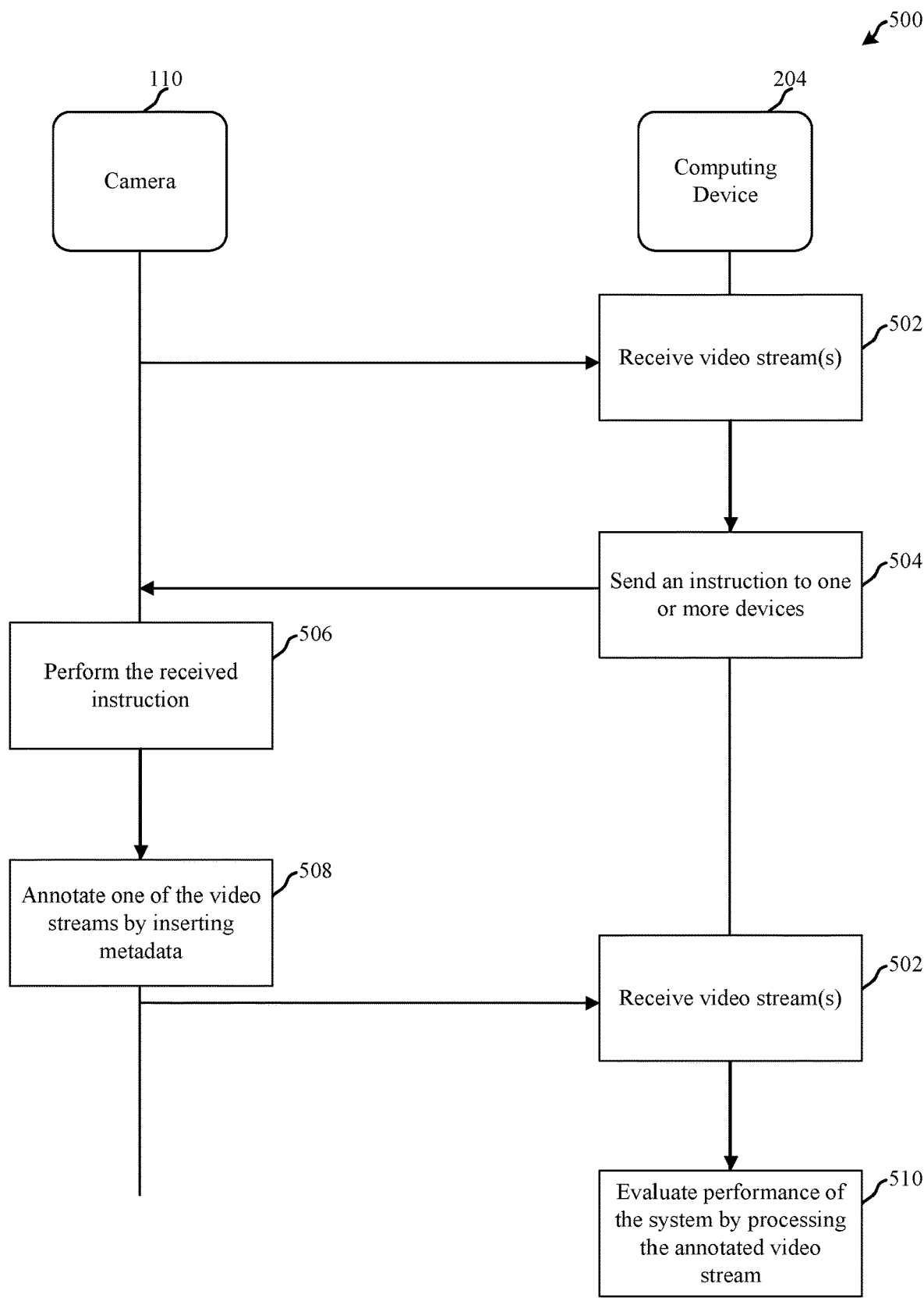
FIG. 5 is a flowchart of a method for video management within a CCTV system.

FIG. 5 is a flowchart of a method for video management within a CCTV system. The method 500 may be performed in some portions by an apparatus such as the computing device 204 and in other portions by an apparatus such as the sensor (e.g., camera) device 110, as described herein with reference to FIG. 6.

At 502, the computing device 204 may receive one or more video streams from one or more sensors of the CCTV system. In an aspect, the one or more sensors may include one or more video cameras 110. The video stream(s) may be transmitted via one or more intermediate devices 115-117 and 202. At least one of the one or more intermediate devices may be configured to alter the video stream to improve transmission and/or storage of the video stream. For example, a transcoder 202 (shown in FIG. 2) may alter the video stream by decoding (for example, from an H.264 format), altering (e.g., reducing the resolution) and encoding once more (for example, back to the H.264 format). The ability to perform transcoding on the fly may simplify storage and management involved with supporting adaptive streaming. In some aspects, the one or more streams may include multiple streams, of respective resolutions and/or frame rates, of the raw video captured by the camera(s) 110. In some aspects, the multiple streams may include a "primary" stream with a certain resolution and frame rate, corresponding to the raw video captured by the camera 110, and one or more additional streams. An additional stream may be the same video stream as the "primary" stream but at a different resolution and/or frame rate, or a stream that captures a portion of the "primary" stream (e.g., cropped to include a portion of the field of view or pixels of the primary stream) at the same or different resolution and/or frame rate as the "primary" stream.

At 504, the computing device 204 may send one or more instructions to the camera 110. As shown in FIG. 3, a technician (operator) may use a control console (not shown in FIG. 3) communicatively coupled to the computing device 204 to send an instruction 302 to the camera 110. In an aspect, the instruction may be a PTZ instruction. The PTZ instruction 302 may request the pan/tilt base of the camera 110 to pan the camera 110 left. In response to sending the instruction 302, the computing device 204 may start the clock 306 to measure PTZ round trip latency. While the PTZ instruction is sent by the computing device 204, a video stream comprising a plurality of video frames 302 is transmitted from the video camera 110 to the computing device 204 via the recorder device 117. The recorder device 117 in this example represents an intermediate device.

At 506, in response to the arrival of the instruction, the video camera 110 may perform the received instruction. For example, the camera 110 may adjust its position according to the received PTZ instruction 302. Subsequent portions of the video stream should reflect adjusted field of view. In an aspect, at 508, in response to receiving the instruction, the video camera 110 may insert metadata that acknowledges the received instruction into the next outgoing frame. The metadata may include at least one of the following information related to the video camera 110: unique video camera identifier (ID), group video camera ID, one or more associated user IDs, geolocation information, timestamp of captured video, direction, inclination, angle, moment, velocity, acceleration, or other environmental parameters. The metadata embedded within the one or more frames represents an in-band channel. In an aspect, the metadata may include a 2-dimensional bar code (such as QR code 400) representing the metadata. This bar code may occupy at least a portion of the one or more video frames. In an aspect, the metadata may comprise a same metadata in each of the one or more video frames. In yet another aspect, the metadata includes a steganography image.

The video camera 110 continues to transmit the video stream towards the computing device 204. The first frame having embedded metadata may reach the computing device 204.

At 510, the computing device 204 may evaluate performance of the CCTV system based on the received metadata. For instance, at 510, the computing device 204 may stop the clock 306 and may determine the PTZ round trip latency.

During product development, system performance measurements, such as latency measurements for example, can help highlight performance bottlenecks, enabling subsequent product improvements. In an aspect, evaluating performance of the CCTV system may further include verifying proper sequential order of one or more frames of the video stream, verifying an identification of the video camera 110 providing the video stream, verifying timing data associated with the performance of the instruction, and/or verifying geolocation data of the video camera 110 providing the video stream.

In other words, from the perspective of the computing device 204, the method 500 includes a method for video management within a Closed Circuit Television (CCTV) system including receiving, at the computer device via one or more intermediate devices in the CCTV system, a video stream generated by a sensor device of the CCTV system, wherein the video stream includes a plurality of video frames. Further, the method includes sending, by the computer device via the one or more intermediate devices of the CCTV system, an instruction to a sensor device configured to generate a video stream including a plurality of video frames. Also, the method includes receiving, by the computer device via the one or more intermediate devices of the CCTV system, one or more frames of the plurality video frames embedded with metadata associated with performance of the instruction by the sensor device. Additionally, the method includes evaluating performance of the CCTV system using the metadata embedded within the one or more video frames.

Similarly, and in other words, from the perspective of the sensor (e.g., camera) 110, the method 500 includes a method for embedding metadata into a video stream within a Closed Circuit Television (CCTV) system that includes generating, by a sensor device of the CCTV system, a video stream including a plurality of video frames, and transmitting, by the sensor device via one or more intermediate devices in the CCTV system, the generated video stream to a receiving computing device. The method further includes receiving, by the sensor device via the one or more intermediate devices in the CCTV system, an instruction from the receiving computing device, and performing, by the sensor device of the CCTV system, the instruction received from the receiving computing device. Also, the method includes embedding, by the sensor device of the CCTV system, metadata associated with performance of the instruction by the sensor device into one or more frames of the plurality video frames. Additionally, the method includes transmitting, by the sensor device via one or more intermediate devices in the CCTV system, metadata associated with performance of the instruction by the sensor device into one or more frames of the plurality video frames.

In one or any combination of these aspects, the metadata embedded within the one or more video frames represents an in-band channel.

In one or any combination of these aspects, at least one of the one or more intermediate devices are configured to alter the video stream to improve transmission and/or storage of the video stream.

In one or any combination of these aspects, evaluating performance of the CCTV system comprises at least one of: verifying proper sequential order of the one or more frames of the video stream, verifying an identification of the sensor device providing the video stream, verifying timing data associated with the performance of the instruction, or verifying geolocation data of the sensor device providing the video stream.

In one or any combination of these aspects, evaluating performance of the CCTV system includes evaluating a round trip latency of the PTZ video camera to the instruction.

In one or any combination of these aspects, the metadata comprises a 2-dimensional bar code representing the metadata.

In one or any combination of these aspects, the 2-dimensional bar code occupies at least a portion of the one or more video frames.

In one or any combination of these aspects, the metadata comprises a sequence of different 2-dimensional bar codes representing a stream of metadata in each of the one or more video frames and wherein the size of the metadata included in the sequence is greater the size of data that can be encoded into a single frame.

In one or any combination of these aspects, the metadata comprises a same metadata in each of the one or more video frames.

In one or any combination of these aspects, the metadata comprises a steganography image.

Advantageously, using in-band data as a general-purpose communications channel enables data transfers beyond the size encoded within one frame. It should be noted that this communication channel is a two-way channel allowing to perform two-way measurements (such as PTZ latency). Advantageously, steganography techniques may be employed to permit in-band communication alongside CCTV operations.

FIG. 6 is a block diagram illustrating a computer system 600 on which aspects of systems and methods for controlling the access to confidential information may be implemented in accordance with an exemplary aspect. The computer system 600 may represent the sensor device 110 or computing device 204 of FIG. 2 above, or the video source 702, the incompatible intermediate device 708, the compatible intermediate device 710, or the video destination 706 in FIGS. 7A-7D below, and can be in the form of multiple computing devices, or in the form of a single computing device, for example, a desktop computer, a notebook computer, a laptop computer, a mobile computing device, a smart phone, a tablet computer, a server, an embedded device, and other forms of computing devices.

As shown, the computer system 600 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, HyperTransport™, InfiniBand™, Serial ATA, I$^2$C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 600, such as those at the time of loading the operating system with the use of the ROM 24.

The computer system 600 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 100. The system memory 22, removable storage devices 27, and non-removable storage devices 28 may use a variety of computer-readable storage media. Examples of computer-readable storage media include machine memory such as cache, static random access memory (SRAM), dynamic random access memory (DRAM), zero capacitor RAM, twin transistor RAM, enhanced dynamic random access memory (eDRAM), extended data output random access memory (EDO RAM), double data rate random access memory (DDR RAM), electrically erasable programmable read-only memory (EEPROM), NRAM, resistive random access memory (RRAM), silicon-oxide-nitride-silicon (SONOS) based memory, phase-change random access memory (PRAM); flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 400.

The system memory 22, removable storage devices 27, and non-removable storage devices 28 of the computer system 600 may be used to store an operating system 35, additional program applications 37, other program modules 38, and program data 39. The computer system 600 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or another peripheral interface. A display device 47 such as one or more monitors, projectors, or integrated display, may also be connected to the system bus 23 across an output interface 48, such as a video adapter. In addition to the display devices 47, the computer system 600 may be equipped with other peripheral output devices (not shown), such as loudspeakers and other audio-visual devices The computer system 600 may operate in a network environment, using a network connection to one or more remote computers 49. The remote computer (or computers) 49 may be local computer workstations or servers comprising most or all of the aforementioned elements in describing the nature of a computer system 600. Other devices may also be present in the computer network, such as, but not limited to, routers, network stations, peer devices or other network nodes. The computer system 600 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

In other words, in an aspect, the computer system 600 includes a hardware processor configured to receive, via one or more intermediate devices in the CCTV system, a video stream generated by a sensor device of the CCTV system. The video stream includes a plurality of video frames. The hardware processor is also configured to: send, via the one or more intermediate devices of the CCTV system, an instruction to a sensor device configured to generate a video stream including a plurality of video frames and receive, via the one or more intermediate devices of the CCTV system, one or more frames of the plurality video frames embedded with metadata associated with performance of the instruction by the sensor device. The hardware processor is further configured to evaluate performance of the CCTV system using the metadata embedded within the one or more video frames.

Figure 7A:
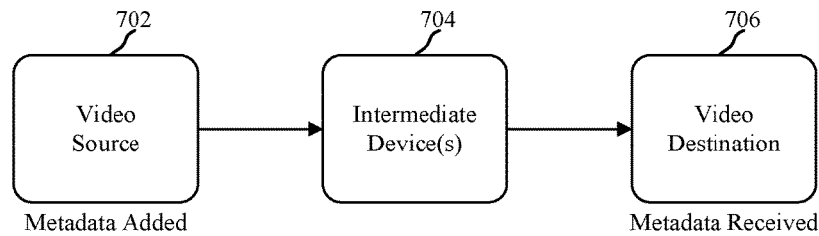
FIG. 7A is a block diagram illustrating an example of video traversing in a CCTV system.

Referring to FIG. 7A, in some cases, a video source 702 (e.g., the camera 110 in FIG. 3) may send video data to a video destination 706 (e.g., a downstream device/client such as the computing device 204 in FIG. 3) through one or more intermediate devices 704 (e.g., the recorder 117 in FIG. 3). In some cases, the intermediate devices 704 may forward the video data from the video source 702 to the video destination 706 but may otherwise not participate in the communication/handling of any metadata that is embedded by the video source 702 in each video frame of the video data.

In some cases, the intermediate devices 704 may also perform some transformations on the video data. For example, the intermediate devices 704 may change the video data resolution, transcode the video data from one codec to another, etc. In these cases, the metadata and/or the transformations performed by the intermediate devices 704 are configured such that the metadata that is embedded in the video frames survives the transformations performed by the intermediate devices 704. For example, an intermediate device 704 may change the codec used for encoding the video frames. For example, the intermediate device 704 may decode the video frame and then re-encode the decoded video frame, e.g., may decode each video frame from H264 and then re-encode the video frame as H265. However, the actual picture in each video frame is still the same picture but just encoded with a different codec. Accordingly, the picture of a QR code that carries the metadata in the video frame may survive this transcoding, hence the video destination 706 that is receiving the video frame can recognize each QR code embedded in the video frames and can extract the data from the QR code.

Some further aspects provide augmented in-band video communication. Specifically, in addition to the video source 702 being able to communicate with the video destination 706 via in-band metadata (e.g., a QR code per video frame), some present aspects extend in-band communication such that one or more of the intermediate devices 704 can amend the metadata, e.g., change the metadata, add to the metadata, subtract from the metadata, etc.

Figure 7B:
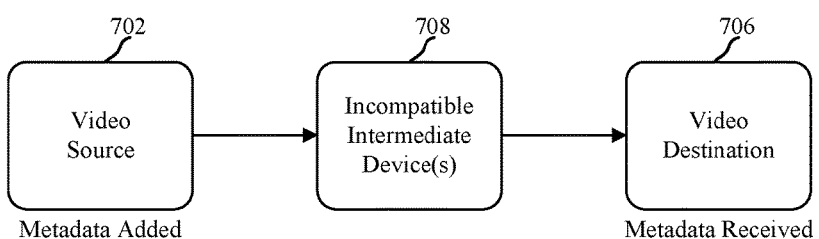
FIG. 7B is a block diagram illustrating an example of video traversing in a CCTV system including incompatible intermediate devices.

For example, referring to FIG. 7B, in some cases, when the video frames pass through an incompatible intermediate device 708, e.g., an intermediate device that does not have the capability to manipulate the metadata embedded in the video frames, the metadata remains untouched even if the video is transcoded by the incompatible intermediate device 708 (provided the resulting image quality is sufficient for the metadata (e.g., QR code) to be decode-able by the video destination 706).

Figure 7C:
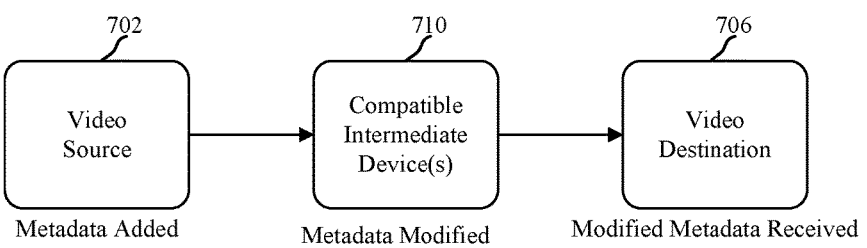
FIG. 7C is a block diagram illustrating an example of video traversing in a CCTV system including compatible intermediate devices.

However, referring to FIG. 7C, in some present aspects, a compatible intermediate device 710, e.g., an intermediate device that has the capability to manipulate the metadata embedded in the video frames, can participate in the in-band one-way communication. In some aspects, for example, the compatible intermediate device 710 may decode the inbound metadata, then relay all/none/part of the decoded metadata along with adding/replacing/amending metadata of the compatible intermediate device 710.

For example, in an aspect, a compatible intermediate device 710 may identify a QR code that includes the metadata in a video frame, remove the QR code, and then insert a different/modified QR code in the same place in the video frame. In doing so, the compatible intermediate device 710 may include diagnostic information of the compatible intermediate device 710 into the modified QR code.

Hence, metadata-capable intermediate devices have the ability to communicate with any compatible downstream device within the chain of video processing equipments.

In some cases, if a compatible intermediate device 710 is reducing video resolution to the point that the original metadata is compromised, some present aspects provide a way for the compatible intermediate device 710 to regenerate the metadata for placement in the outbound video stream.

Figure 7D:
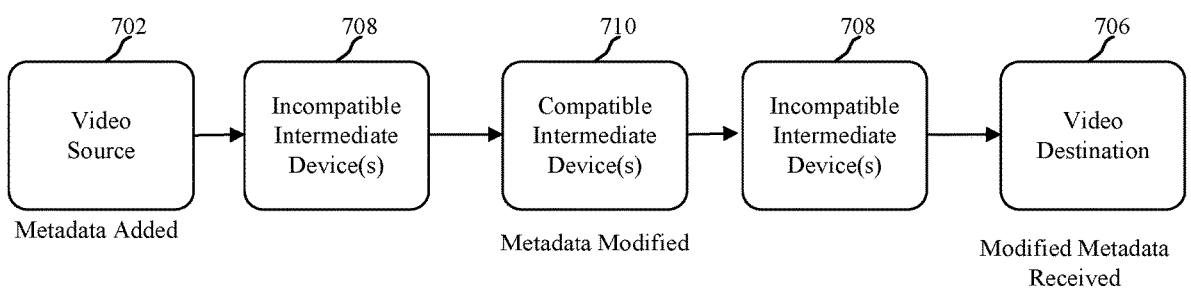
FIG. 7D is a block diagram illustrating an example of video traversing in a CCTV system including compatible and incompatible intermediate devices.

Referring to FIG. 7D, the path from the video source 702 to the video destination 706 may include one or more incompatible intermediate devices 708 and one or more compatible intermediate devices 710. In these aspects, the incompatible intermediate devices 708 may merely forward the video data without modifying the embedded metadata, while the one or more compatible intermediate devices 710 may modify the embedded metadata before forwarding the video data.

Accordingly, in addition to allowing cameras to embed diagnostic information to facilitate internal testing during development and on-site diagnostics for deployed equipments, some present aspects allow for additional communication features so that compatible intermediate devices can receive data from any upstream device, send data to any downstream device, and inject their own statistics and diagnostic information such as video quality data on the inbound and outbound sides, latency timing data (to help highlight bottlenecks in the video transmission chain), etc. In these aspects, incompatible intermediate devices will be transparent to this metadata communication channel.

In some cases, placing QR codes within a video frame may be intrusive, and there may be cases where there is too much metadata to fit in one frame. In these cases, the metadata can be spread across a group of frames. In some cases, the metadata may fit within one frame and may be relevant to each frame, hence every frame is modified. In some cases, the metadata may be of a low frequency, so may only need to be placed in an occasional frame, for example, for daily diagnostics/health reporting.

As described with reference to various aspects herein, two dimensional barcodes (e.g., QR codes) may be placed within each video frame to embed metadata within a video stream. In some present aspects, each compatible intermediate device may include a QR code decoder and encoder. After decoding the incoming metadata that is embedded within a video frame, the compatible intermediate device may then edit/add/replace the metadata with the metadata of the compatible intermediate device. The new metadata is then encoded and placed in each outbound video frame. This may require encoding of the outbound video (e.g., H.264 encoding), which the compatible intermediate device may already be doing (e.g., transcoding the video to a lower resolution to save outbound bandwidth).

Accordingly, some present aspects provide a one-way communication "bus" with multiple participants which include not only a source and a destination but also intermediate devices that may no longer be transparent to the in-band metadata communicated over the one-way communication bus.

In some further aspects, in order to protect the information included in the metadata by the video source 702, the video source 702 may encrypt the information that the video source 702 is conveying via embedded metadata. This prevents a compatible intermediate device 710 from intentionally or unintentionally corrupting/altering the diagnostic or other data provided by the video source 702 via metadata embedded in a video frame. For example, since the information of the video source 702 as conveyed via embedded metadata is encrypted, the compatible intermediate device 710 may augment or replace the information that the video source 702 has embedded within metadata, but is otherwise unable to alter or tamper with the information that the video source 702 has embedded within the metadata.

In some aspects, out-of-band channels may also allow devices in a chain of video equipment to communicate. However, for metadata that is tightly coupled to each video frame, synchronizing the metadata with the corresponding frame may become difficult when metadata is communicated over out-of-band channels.

Although some present aspects are described herein with reference to a CCTV system, the present aspects are not so limited, and are applicable to other video transport systems or video management systems. For example, the present aspects are applicable to TV broadcasting or IPTV streaming where the embedded metadata reaches a collection of destinations. For example, in an aspect, instead of a chain of devices, the communications fans out to multiple endpoints, and a hierarchy of devices exists, with video being sent to multiple destinations at multiple stages. The communication is still one-way, but the topology becomes a tree rather than a linear chain of devices.

As another example, the present aspects are also applicable for delivering software updates or security keys to a large collection of devices, such as, for example, set top boxes, one in each customer's house.

Figure 8:
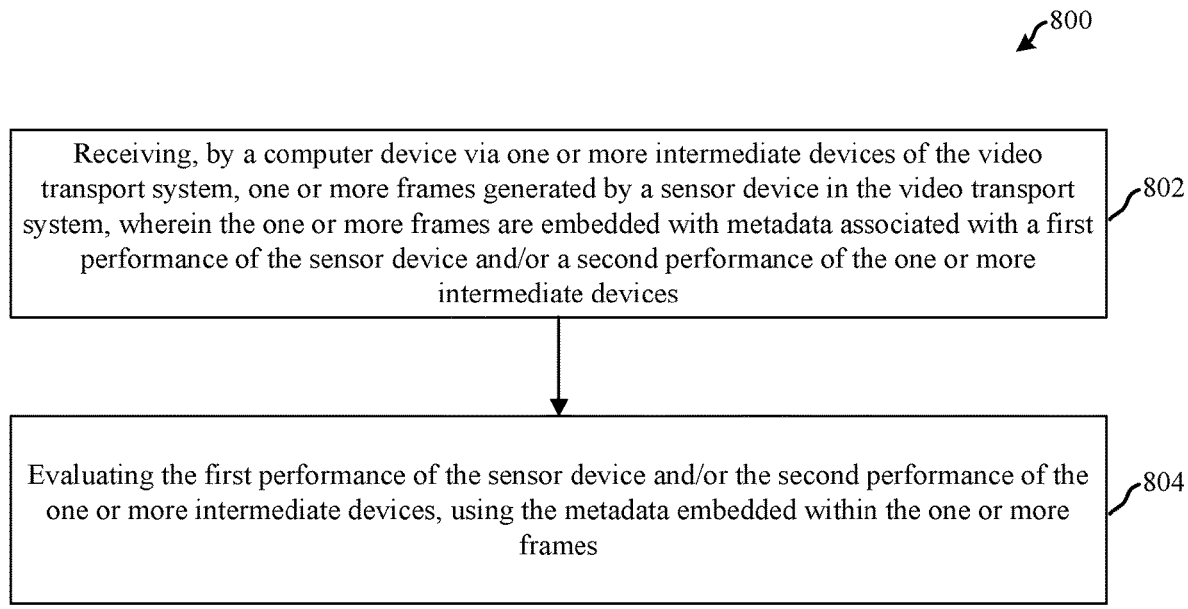
FIG. 8 is a flowchart of an example method for video management by a video destination.
Figure 9:
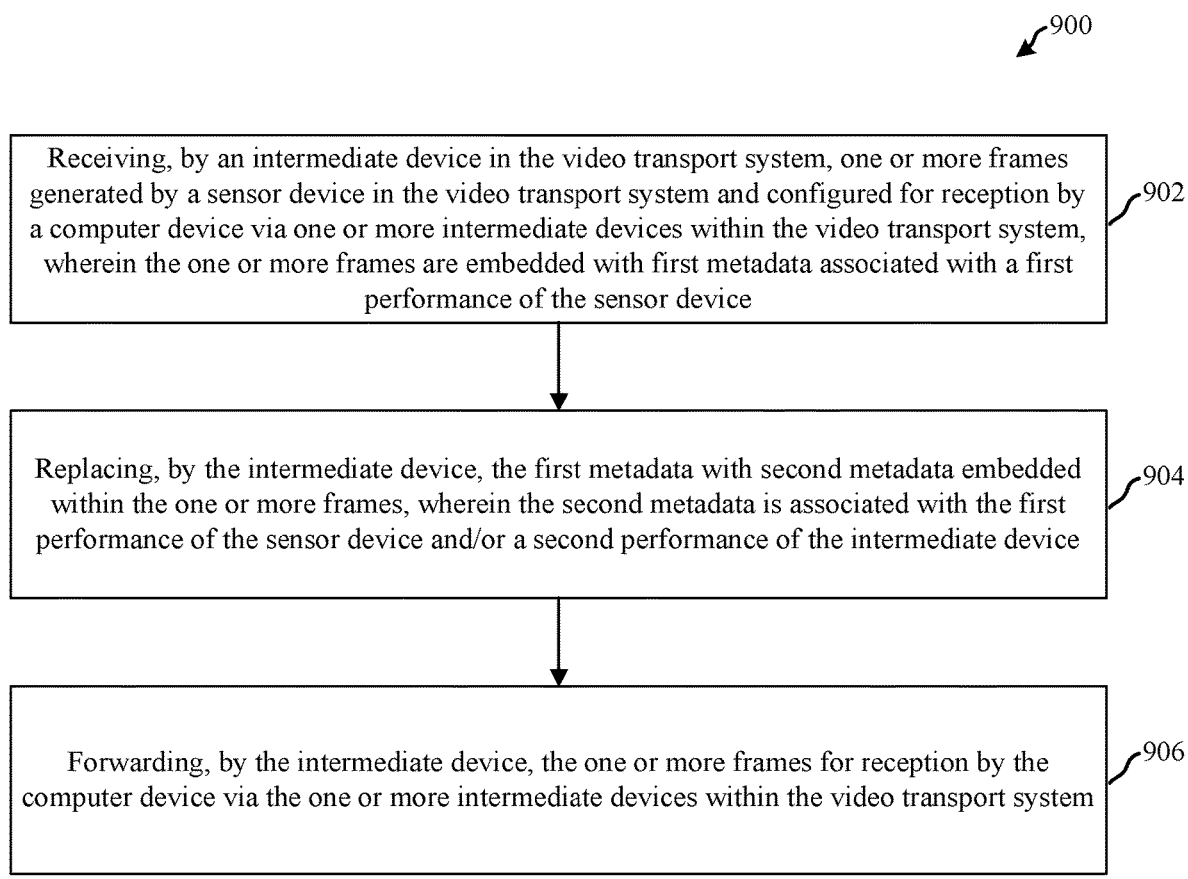
FIG. 9 is a flowchart of an example method for video management by an intermediate device.

FIGS. 8 and 9 are flowcharts of example methods 800 and 900 for video management within a video transport system, which may be or may include, but is not limited to, a CCTV system, a video management system, a broadcast TV system, etc. Each one of methods 800 or 900 may be performed by an apparatus such as the computer system 600 implementing all or a portion of an applicable device described herein, such as the computing device 204, the recorder 117, the video destination 706, the compatible intermediate device 708, etc.

Referring to FIG. 8, at block 802 method 800 for video management within a video transport system includes receiving, by a computer device via one or more intermediate devices of the video transport system, one or more frames generated by a sensor device in the video transport system, wherein the one or more frames are embedded with metadata associated with a first performance of the sensor device and/or a second performance of the one or more intermediate devices. For example, in an aspect, the computing device 204, the video destination 706, the computer system 600, or the processor 21 may be configured to or may comprise means for receiving, by a computer device via one or more intermediate devices of the video transport system, one or more frames generated by a sensor device in the video transport system, wherein the one or more frames are embedded with metadata associated with a first performance of the sensor device and/or a second performance of the one or more intermediate devices.

For example, the video source 702 may generate one or more frames, which are forwarded to the video destination 706 via the intermediate devices 704. The video source 702 may embed metadata in the one or more frames, where the metadata is associated with a performance of the video source 702, e.g., performance of an instruction previously received from the video destination 706. The intermediate devices may also replace or modify the metadata to include metadata associated with a performance of the intermediate devices 704.

At block 804 method 800 includes evaluating the first performance of the sensor device and/or the second performance of the one or more intermediate devices, using the metadata embedded within the one or more frames. For example, in an aspect, the computing device 204, the video destination 706, the computer system 600, or the processor 21 may be configured to or may comprise means for evaluating the first performance of the sensor device and/or the second performance of the one or more intermediate devices, using the metadata embedded within the one or more frames.

For example, the video destination 706 may use the metadata embedded within one or more received frames to evaluate performance of an applicable one of the video source 702 and/or the intermediate devices 704 that embedded the metadata into the received frames.

In one or any combination of these aspects, the sensor device is configured to embed, within the one or more frames, a first 2-dimensional bar code representing first metadata associated with the first performance of the sensor device, wherein the first 2-dimensional bar code occupies at least a portion of the one or more frames.

In one or any combination of these aspects, the sensor device is configured to encrypt and/or digitally sign the first metadata that is represented by the first 2-dimensional bar code that is embedded within the one or more frames. In aspects where the metadata is signed, the signed content may still be viewed by downstream devices but cannot be tampered with. In aspects where the metadata is encrypted, the encrypted content can only be viewed by those with the corresponding decryption keys.

In one or any combination of these aspects, a size of the first 2-dimensional bar code is selected based on whether the one or more intermediate devices are configured to reduce a resolution of the one or more frames embedded with the first 2-dimensional bar code.

In one or any combination of these aspects, an intermediate device within the one or more intermediate devices is configured to replace the first 2-dimensional bar code with a second 2-dimensional bar code.

In one or any combination of these aspects, the second 2-dimensional bar code represents the first metadata associated with the first performance of the sensor device.

In one or any combination of these aspects, the second 2-dimensional bar code represents second metadata associated with the second performance of the intermediate device.

In one or any combination of these aspects, the second 2-dimensional bar code represents both the first metadata associated with the first performance of the sensor device and second metadata associated with the second performance of the intermediate device.

In one or any combination of these aspects, the metadata embedded within the one or more frames represents an in-band channel.

In one or any combination of these aspects, the one or more frames are included in a video stream generated by the sensor device, wherein receiving the one or more frames comprises receiving the one or more frames responsive to sending, by the computer device via the one or more intermediate devices, an instruction to the sensor device, wherein the first performance of the sensor device comprises the first performance of the instruction by the sensor device.

In one or any combination of these aspects, at least one of the one or more intermediate devices are configured to alter the video stream to improve transmission and/or storage of the video stream.

In one or any combination of these aspects, evaluating the first performance of the instruction by the sensor device comprises at least one of verifying proper sequential order of the one or more frames; verifying an identification of the sensor device; verifying timing data associated with the first performance of the instruction; or verifying geolocation data of the sensor device providing the video stream.

In one or any combination of these aspects, evaluating the first performance of the instruction by the sensor device includes evaluating a round trip latency of a PTZ video camera to the instruction.

In one or any combination of these aspects, the metadata comprises a sequence of different 2-dimensional bar codes representing a stream of metadata in each of the one or more frames, wherein a size of the metadata included in the sequence is greater a size of data that is encodable into a single frame.

In one or any combination of these aspects, the metadata comprises a same metadata in each of the one or more frames.

In one or any combination of these aspects, the metadata comprises a steganography image.

In one or any combination of these aspects, the sensor device is configured to embed, within an audio stream associated with the one or more frames, first metadata associated with the first performance of the sensor device. In one or any combination of these aspects, an intermediate device within the one or more intermediate devices is configured to replace the first metadata with second metadata embedded within the audio stream, wherein the second metadata is associated with the first performance of the sensor device and/or the second performance of the intermediate device.

For example, in an aspect, metadata embedded within an audio stream is transmitted from the video source 702 to the video destination 706, via one or more compatible intermediate devices 710 and/or one or more incompatible intermediate devices 708. In these aspects, the compatible intermediate devices 710 can read and modify the metadata embedded within the audio stream.

In one or any combination of these aspects, the sensor device is configured to embed first metadata within an audio stream and second metadata within a video stream; and wherein the first metadata and the second metadata are configured for audio/video synchronization at the sensor device, at the one or more intermediate devices, and/or at the computer device.

For example, in an aspect, metadata embedded within audio alongside metadata embedded within video can facilitate audio/video synchronization (lip sync). This may be useful where intermediate devices modify the video and/or audio (e.g., transcoding the content from one codec to another). Equipment manufactures may also benefit from being able to measure audio/video sync at the video source 702, at the intermediate device(s) 704, 708, 710, and/or at the video destination 706 (or video destination devices, if broadcasting to many endpoints).

Referring to FIG. 9, at block 902 method 900 for embedding metadata into a video stream within a CCTV system includes receiving, by an intermediate device in the CCTV system, one or more frames generated by a sensor device in the CCTV system and configured for reception by a computer device via one or more intermediate devices within the CCTV system, wherein the one or more frames are embedded with first metadata associated with a first performance of the sensor device. For example, in an aspect, the computing device 204, the video destination 706, the computer system 600, or the processor 21 may be configured to or may comprise means for receiving, by an intermediate device in the CCTV system, one or more frames generated by a sensor device in the CCTV system and configured for reception by a computer device via one or more intermediate devices within the CCTV system, wherein the one or more frames are embedded with first metadata associated with a first performance of the sensor device.

For example, the compatible intermediate device 710 may receive one or more frames generated by the video source 702, where the video source 702 has embedded metadata associated with performance of the video source 702, e.g., performance of an instruction previously received from the video destination 706.

At block 904 method 900 includes replacing, by the intermediate device, the first metadata with second metadata embedded within the one or more frames, wherein the second metadata is associated with the first performance of the sensor device and/or a second performance of the intermediate device. For example, in an aspect, the computing device 204, the video destination 706, the computer system 600, or the processor 21 may be configured to or may comprise means for replacing, by the intermediate device, the first metadata with second metadata embedded within the one or more frames, wherein the second metadata is associated with the first performance of the sensor device and/or a second performance of the intermediate device.

For example, the compatible intermediate device 710 may remove the metadata that was embedded by the video source 702 and embed the received frames with different metadata that is associated with performance of the video source 702 and/or performance of the compatible intermediate device 710.

At block 906 method 900 includes forwarding, by the intermediate device, the one or more frames for reception by the computer device via the one or more intermediate devices within the CCTV system. For example, in an aspect, the computing device 204, the video destination 706, the computer system 600, or the processor 21 may be configured to or may comprise means for forwarding, by the intermediate device, the one or more frames for reception by the computer device via the one or more intermediate devices within the CCTV system.

For example, after replacing the metadata embedded in the received frames, the compatible intermediate device 710 may forward the frames through a chain of equipment, for reception by the video destination 706.

In one or any combination of these aspects, the sensor device is configured to embed, within the one or more frames, a first 2-dimensional bar code representing the first metadata associated with the first performance of the sensor device, wherein the first 2-dimensional bar code occupies at least a portion of the one or more frames.

In one or any combination of these aspects, replacing the first metadata comprises replacing, by the intermediate device, the first 2-dimensional bar code with a second 2-dimensional bar code.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method for video management within a video transport system, comprising:

receiving, by a computer device via one or more intermediate devices of the video transport system, one or more frames generated by a sensor device in the video transport system, wherein the one or more frames are embedded by the sensor device with first metadata associated with a first performance of the sensor device, wherein the first metadata embedded within the one or more frames is decoded by a first device within the one or more intermediate devices and replaced by the first device with second metadata embedded within the one or more frames, the second metadata being associated with the first performance of the sensor device and/or a second performance of the one or more intermediate devices, wherein the first metadata comprises a bar code that occupies a portion of the one or more frames, and a size of the bar code is selected based on a determination of whether the one or more intermediate devices are configured to reduce a resolution of the one or more frames; and evaluating the first performance of the sensor device and/or the second performance of the one or more intermediate devices, using the second metadata embedded within the one or more frames by the first device.

2. The method of claim 1, wherein the bar code comprises a first 2-dimensional bar code representing the first metadata associated with the first performance of the sensor device, wherein the first 2-dimensional bar code occupies at least the portion of the one or more frames.

3. The method of claim 2, wherein the sensor device is configured to encrypt and/or digitally sign the first metadata that is represented by the first 2-dimensional bar code that is embedded within the one or more frames.

4. The method of claim 2, wherein the size of the first 2-dimensional bar code is selected based on whether the one or more intermediate devices are configured to reduce the resolution of the one or more frames embedded with the first 2-dimensional bar code.

5. The method of claim 2, wherein the first device is configured to replace the first 2-dimensional bar code with a second 2-dimensional bar code.

6. The method of claim 5, wherein the second 2-dimensional bar code represents the first metadata associated with the first performance of the sensor device.

7. The method of claim 5, wherein the second 2-dimensional bar code represents the second metadata associated with the second performance of the first device.

8. The method of claim 5, wherein the second 2-dimensional bar code represents both the first metadata associated with the first performance of the sensor device and the second metadata associated with the second performance of the first device.

9. The method of claim 1, wherein the first metadata embedded within the one or more frames represents an in-band channel.

10. The method of claim 1, wherein the one or more frames are included in a video stream generated by the sensor device, wherein receiving the one or more frames comprises receiving the one or more frames responsive to sending, by the computer device via the one or more intermediate devices, an instruction to the sensor device, wherein the first performance of the sensor device comprises the first performance of the instruction by the sensor device.

11. The method of claim 10, wherein at least one of the one or more intermediate devices are configured to alter the video stream to improve transmission and/or storage of the video stream.

12. The method of claim 10, wherein evaluating the first performance of the instruction by the sensor device comprises at least one of:
  verifying proper sequential order of the one or more frames;
  verifying an identification of the sensor device;
  verifying timing data associated with the first performance of the instruction; or
  verifying geolocation data of the sensor device providing the video stream.

13. The method of claim 10, wherein evaluating the first performance of the instruction by the sensor device includes evaluating a round trip latency of a pan, tilt, and zoom (PTZ) video camera to the instruction.

14. The method of claim 1, wherein the first metadata comprises a sequence of different 2-dimensional bar codes representing a stream of metadata in each of the one or more frames, wherein a size of the first metadata included in the sequence is greater than a size of data that is encodable into a single frame.

15. The method of claim 1, wherein the first metadata comprises a same metadata in each of the one or more frames.

16. The method of claim 1,
  wherein the sensor device is further configured to embed the first third metadata within an audio stream; and
  wherein the first metadata and the third metadata are configured for audio/video synchronization at the sensor device, at the one or more intermediate devices, and/or at the computer device.

17. A method for communicating a video stream within a video transport system, comprising:
  receiving, by a first device in the video transport system, one or more frames generated by a sensor device in the video transport system and configured for reception by a computer device via one or more intermediate devices within the video transport system, wherein the one or more intermediate devices include the first device, wherein the one or more frames are embedded, by the sensor device, with first metadata associated with a first performance of the sensor device, wherein the first metadata comprises a bar code that occupies a portion of the one or more frames, and a size of the bar code is selected based on a determination of whether the one or more intermediate devices are configured to reduce a resolution of the one or more frames;
  decoding, by the first device, the first metadata embedded within the one or more frames and replacing the first metadata with second metadata embedded within the one or more frames, wherein the second metadata is associated with the first performance of the sensor device and/or a second performance of the one or more intermediate devices; and
  forwarding, by the first device, the one or more frames for reception by the computer device via the one or more intermediate devices within the video transport system.

18. A video transport system for video management, comprising:
  a memory storing instructions; and
  a hardware processor configured to execute the instructions to:
    receive, via one or more intermediate devices of the video transport system, one or more frames generated by a sensor device in the video transport system, wherein the sensor device is configured to embed first metadata in the one or more frames, the first metadata being associated with a first performance of the sensor device, wherein the first metadata comprises a bar code that occupies a portion of the one or more frames, and a size of the bar code is selected based on a determination of whether the one or more intermediate devices are configured to reduce a resolution of the one or more frames, wherein a first device within the one or more intermediate devices is configured to decode the first metadata embedded within the one or more frames and replace the first metadata with second metadata embedded within the one or more frames, the second metadata being associated with the first performance of the sensor device and/or a second performance of the one or more intermediate devices; and
    evaluate the first performance of the sensor device and/or the second performance of the one or more intermediate devices, using the second metadata embedded within the one or more frames by the first device.

\* \* \* \* \*